United States Patent [19]
Bleimund

[11] 3,823,629
[45] July 16, 1974

[54] DEVICE FOR CUTTING PIECES OF FABRIC FROM FABRIC ROLLS

[75] Inventor: Rolf Bleimund, Bielefeld, Germany

[73] Assignee: Herbert Kannegiesser Kommanditgesellschaft, Vlotho/Weser, Hollwiesen, Germany

[22] Filed: Mar. 2, 1973

[21] Appl. No.: 337,504

[52] U.S. Cl............ 83/94, 83/277, 83/280, 83/372, 83/417, 83/419, 83/421, 83/477.2, 83/488, 83/650, 83/925 CC
[51] Int. Cl............................................ B65h 35/04
[58] Field of Search....... 83/94, 277, 279, 732, 417, 83/409, 421, 419, 280, 372, 477.2, 488, 650, 925 CC; 270/30

[56] References Cited
UNITED STATES PATENTS
1,609,654  12/1926  Makowski.................. 83/277 X
3,701,299  10/1972  Stumpf........................ 83/409 X Primary Examiner—Frank T. Yost
Attorney, Agent, or Firm—Sughrue, Rothwell, Mion, Zinn & Macpeak

[57] ABSTRACT

An apparatus for cutting lengths of fabric pulled from a selected roll on a rotary magazine. A transverse carriage 15 is movable along the side rails 14 of a table 12 and carries grippers 19 for pulling off a selected length of fabric. A transverse cutter 16 severs the fabric at the end of the pull and the stacked fabric layers 10 are held tightly at one end by a clamp 17. As a length of fabric is being drawn out from a selected roll, side edge drifts are sensed and the magazine is automatically moved in a direction opposite to the drift to compensate therefor and maintain the stacked layers neatly aligned.

26 Claims, 9 Drawing Figures

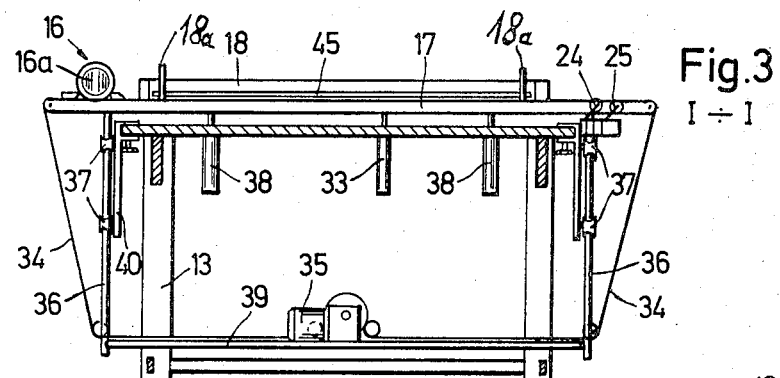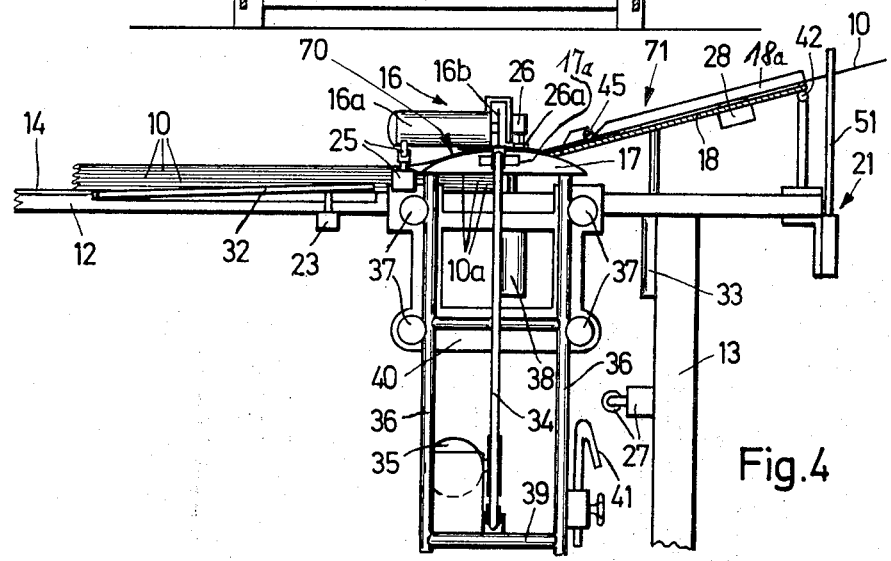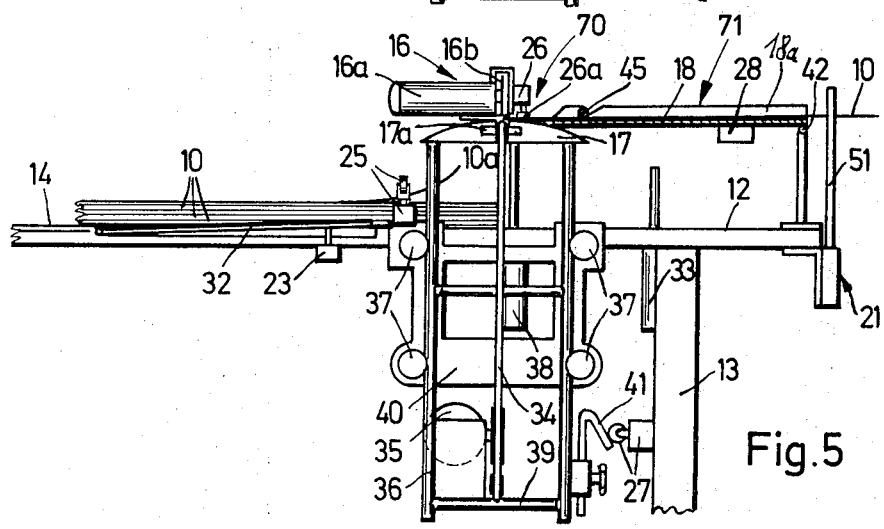

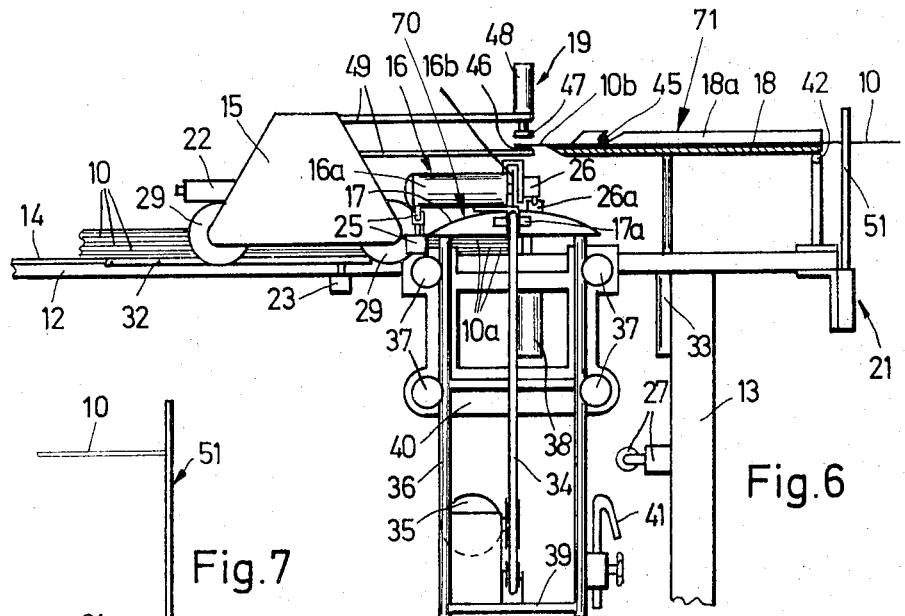
Fig.6
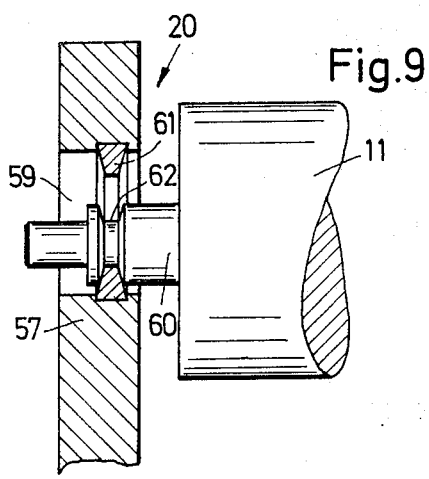
Fig.7
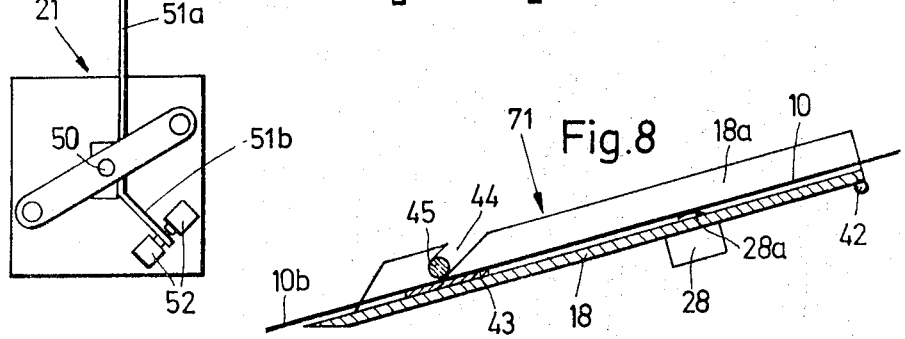
Fig.8
Fig.9

3,823,629

DEVICE FOR CUTTING PIECES OF FABRIC FROM FABRIC ROLLS

BACKGROUND OF THE INVENTION

1. Field of the Invention

The present invention relates to a device for cutting pieces of fabric from fabric rolls and for laying the pieces edge-to-edge on top of one another.

2. Prior Art

The known devices of the above-mentioned type, which are also known as web cutting devices, are relatively expensive and can only be used economically for cutting pieces of fabric and laying the pieces edge-to-edge on top of one another, if a complete roll of fabric can be used up at one time. This is now impossible in a large number of factories, for example, in factories manufacturing shirts and underwear, as fashion influences require that a large number of small groups of fabric pieces, having different designs, are manufactured daily.

SUMMARY OF THE INVENTION

The object of the invention is to provide a device of the above-described type, which is particularly suited to the manufacturing conditions in factories producing shirts and underwear, where it is important for the fabric rolls to be changed rapidly, and for cutting losses to be relatively small.

The invention is characterized by:

a. A rotatable magazine holding several rolls of fabric. The magazine is arranged at one of the front ends of a known supporting plate and is displaceable parallel to the ends of this plate on a frame, which is preferably provided with tread rollers.

b. A carriage displaceable in a reciprocating manner in a longitudinal direction along the supporting plate. The carriage draws the desired length of fabric to be cut, away from one of the fabric rolls c. a cross-cutting device for cutting the pieces of fabric. This cutting device moves in a reciprocating manner at right angles to the direction of movement of the carriage, and as a function of the same.

d. A control device for keeping straight, in a longitudinal direction of the supporting plate, the side edges of the fabric pieces drawn away from the fabric rolls in the magazine by the carriage. This control device keeps the side edges of the fabric pieces straight by displacing the magazine in the opposite direction to the direction of movement of the side edges, and parallel to the front end of the supporting plate and the cutting line of the cross-cutting device.

The device according to the invention enables pieces of fabric of any desired length to be drawn alternately from a plurality of rolls of differently designed fabric; for these pieces to be cut off with minimal cutting wastage; and for the pieces to be arranged edge-to-edge on top of one another.

The device according to the invention is advantageously provided with a locking device, preferably a clamp, which may be controlled as a function of the cross-cutting device. The locking device or clamp holds the roll side ends, or end edges, of the cut fabric pieces resting on the supporting plate. The device is also preferably provided with a delivery arrangement controllable as a function of the carriage. This delivery device is provided for the leading edge of the fabric web to be drawn from one of the fabric rolls in the magazine.

These two devices permit, inter alia, a particularly rational modus operandi in the cutting region of the device, i.e., no manual activity during the continuous production of fabric pieces from a fabric roll.

Other advantageous features of the invention will be made apparent from the following description of an embodiment of the invention provided with reference to the accompanying drawings. The invention not only consists of the features disclosed in the individual claims, but of any possible combination of these features.

The device may be designed to operate semi-automatically (manual displacement of the carriage), or fully automatically (mechanical displacement of the carriage in a reciprocating manner).

The device according to the invention is also simple and operationally reliable.

An embodiment of the invention is represented diagrammatically in the drawings, in which:

BRIEF DESCRIPTION OF THE DRAWINGS

FIG. 3 is a cross-section of the device along the line I—I in FIG. 1,

FIG. 4 is a part of FIG. 1 showing the clamp holding the fabric pieces on the supporting plate and the cross-cutting device in a cutting position, FIG. 5 is a side view according to FIG. 4, but after the cutting process, showing the clamp in a raised position for placing the end of the cut fabric web on the supporting plate, or on the pieces of fabric already in position on the plate, FIG. 6 is a side view according to FIG. 4, showing the raised, hinged flap supplying the carriage with a new fabric web, FIG. 7 is a front view, on an enlarged scale, of a control device for keeping straight the side edges of the fabric pieces, FIG. 8 is a sectional view, on an enlarged scale, through the hinged flap, FIG. 9 is a sectional view, on an enlarged scale, through the bearing area of a fabric roll axis in a bearing flange of the magazine.

DESCRIPTION OF THE PREFERRED EMBODIMENTS

Figure 1:
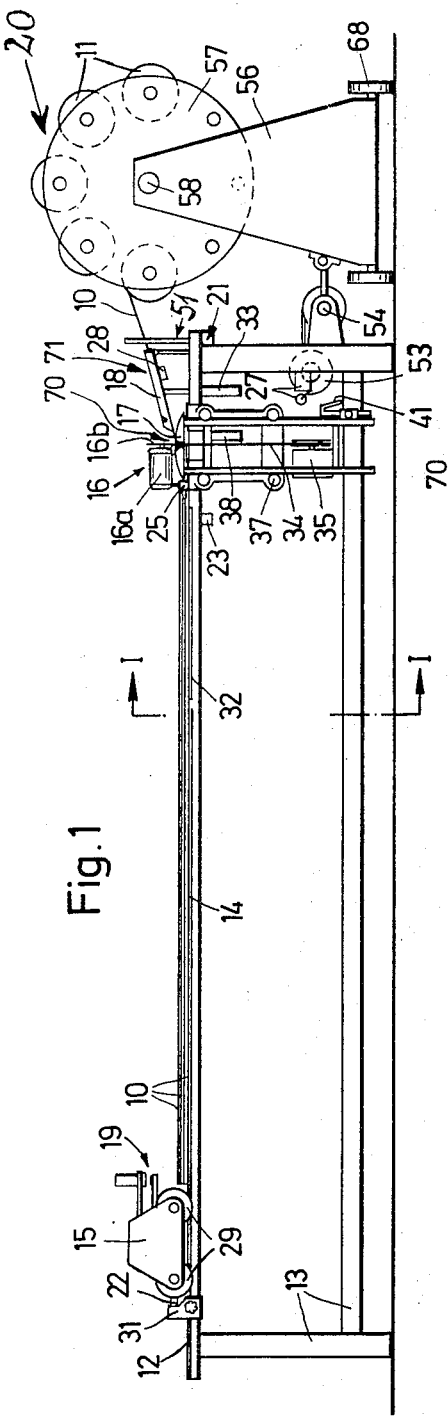
FIG. 1 is a side view of the device according to the invention.

The drawings show the device according to the invention, which is designed for cutting pieces of fabric 10 from fabric rolls 11, and for placing the same edge-to-edge on top of one another. This device is provided with a supporting plate 12 for the cut pieces of fabric 10.

A carriage 15 for drawing the desired length of fabric 10 to be cut from the fabric roll 11, is mounted on guide rails 14, arranged along the supporting plate 12. The carriage is adapted to be displaced mechanically or manually in a reciprocating manner.

The carriage 15 is provided with tread rollers 29, the guide grooves of which encompass the guide rails 14.

The longitudinal edges of the supporting plate 12 can also be used to guide the carriage 15.

A reciprocating cross-cutting device 16 is arranged in the region of one front end of the supporting plate 12, at right angles to the direction of movement of the carriage 15 and as a function of the same. This cutting device 16 separates from the fabric roll 11, the piece of fabric 10, which has been drawn therefrom.

A clamp 17, vertically adjustable as a function of the cutting device 16, is provided in the region of the cross-cutting device 16 on the supporting plate 12. This clamp 17 holds the cut pieces of fabric by the fabric roll side end, namely the end edge 10a, having a tensioning effect on one side. A delivery arrangement 71, displaceable as a function of the the carriage 15, after the cutting operation, is associated with the clamp 17.

A plurality of grippers 19, attached to the carriage 15, grip, above the cutting level, the leading edge 10b of the web 10, which is held by the delivery device 71. These grippers 19 grip the leading edge of the fabric 10 during the movement of the carriage 15, i.e., as the piece of fabric 10 is drawn off the fabric roll 11.

A rotatable, detachable, magazine 20 receiving a plurality of fabric rolls 11 is provided on the cutting side at the front end of the supporting plate 12. This magazine is adapted to be displaced by a control device 21, in a reciprocating manner, at right angles to the direction of movement of the carriage 15, to keep the side edges of the fabric pieces in line as they are removed from the fabric rolls 11. In its method of operation, this control device 21 is dependent on the web 10, which is supported on the delivery arrangement 71.

Electrical control devices, for example, a control device 21, and switches 22, 23, 24, 25, 26, 27, and 28, are arranged on at least one part of the above-mentioned devices 12, 13. These electrical devices control the movements of the individual devices, i.e., parts 15, 16, 17, 71, and 20.

Figure 2:
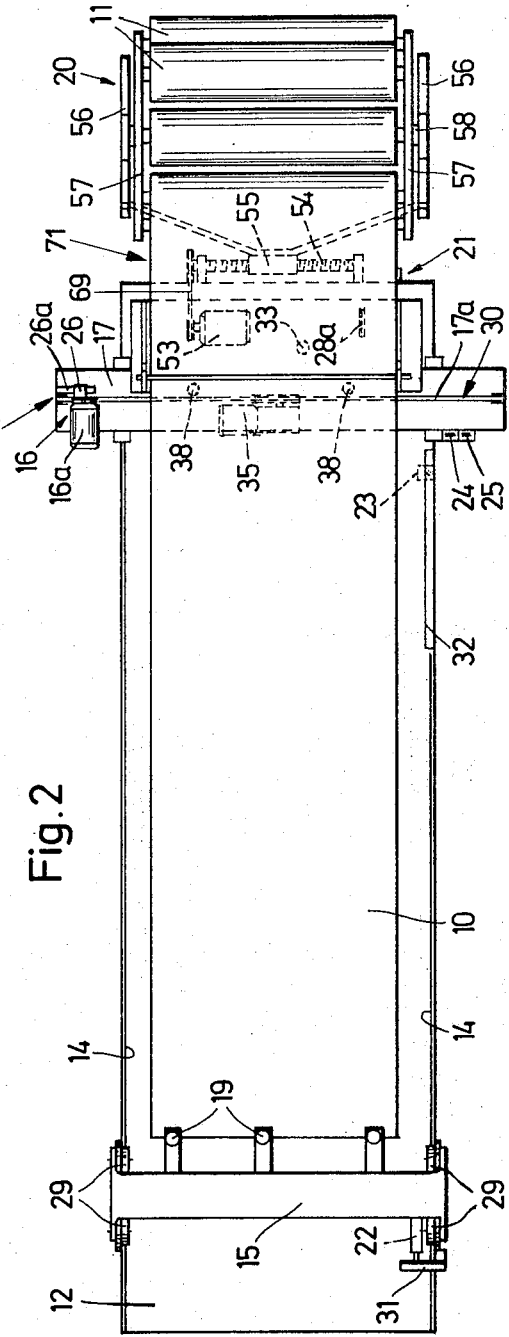
FIG. 2 is a plan view of the device according to FIG. 1.

A stop 31 is arranged in the region of the guide rails 14 at a distance from the cutting line 30 (FIG. 2) of the cross-cutting device 16. This stop 31 is displaceably mounted on the supporting plate 12 in a longitudinal direction of this plate, and is adapted to be locked in position. The stop 31 cooperates with the switch 22, e.g., a pressure switch, on the carriage 15, in such a manner that, when the switch 22 presses against the stop 31, the cross-cutting device 16 is moved in the cutting line 30.

Any desired length of web 10 can be cut by adjusting the stop 31 in the longitudinal direction of the supporting plate 12.

A switch 23, e.g., a pressure switch, is attached to the supporting plate 12 in the region adjacent a guide rail 14. This switch 23 is activated by a mobile part of the guide rail 14, preferably by an abutting ledge 32, arranged on the guide rail 14. When the carriage 15 reaches the displaceable part of the guide rail 14, i.e., the abutting ledge 32, the switch 23 controls the delivery arrangement 71 into a suitable position for gripping the leading edge 10b with the grippers 19.

The cross-cutting device 16 consists of an electric drive motor 16a, provided with a rotary cutting disc 16b mounted on its shaft journal. The drive motor 16a is displaceably mounted on the clamp 17, in a cutting groove 17a, preferably having a T-shaped cross-section. This also forms the cutting line 30. The drive motor 16a is driven in a reciprocating manner by means of a belt drive 34, chain drive, or the like, by a drive mechanism 35 disposed below the supporting plate 12, for example, an electro-motor provided with gears.

Two switches 24, 25, e.g., pressure switches, arranged in succession in the cutting direction of the cross-cutting device 16, are provided close to the clamp 17 on the supporting plate 12 in one of the end regions of the clamp 17, which is arranged at right angles to the direction of movement of the carriage. The switch 24, which is foremost in the cutting direction, effects the return movement of the cross-cutting device 16, and the second switch 25, which is activated by the action of the cross-cutting device 16, begins a lifting movement of the clamp 17 with the cross-cutting device 16. The lifting movement of the clamp 17 enables the end of the fabric on the side of the cutting line, i.e., the end edge 10a of the piece of fabric 10, which has just been cut, to fall from the clamp 17 down onto the previously cut pieces of fabric 10, or onto the supporting plate 12. The piece of fabric is then gripped firmly on one side on the supporting plate 12 during the backward movement of the clamp 17.

The clamp 17 is guided on the supporting plate 12, in a vertically adjustable manner by means of lateral, vertical guides 36, e.g., guide rods, in (between) the guides 37, e.g. guide rollers rotatably mounted in the supporting parts 40. The clamp 17 is adapted to be moved up and down by a lifting device 38, e.g. by one or more pressure cylinders controlled by the switch 25. The switch 25 is connected via electric lines to a device controlling the lifting device 38.

Together with the clamp 17 and a cross-support 39 arranged below the supporting plate, the guide rods 36, arranged on both longitudinal sides of the supporting plate 12, form a vertically adjustable frame. The drive mechanism 35 for the reciprocating movement of the cross-cutting device 16 is mounted on the cross-support 39 of the frame, so that this also follows the lifting movement. The belt drive 34 is adapted to be tensioned by means of a tensioning roller.

A vertically adjustable stop 41 is attached to the vertical guides 36. This stop 41 cooperates with a switch 27, e.g. a pressure switch, arranged on the underframe 13. When activated by the stop 41, the switch 27 limits the lifting movement of the clamp 17, interrupting it or reversing it. The stop 41 allows the lifting movement to be varied to some extent. This movement can thus be adjusted to the stacking thickness of the cut fabric 10.

The delivery device 71 advantageously consists of a hinged flap 18 arranged about an axis 42 parallel to the cutting line 30. This flap may be moved up and down by means of a lifting device, e.g. a pressure cylinder controlled by the abutting ledge 32 or the switch 23. The length of the hinged flap 18, from its axis 42 to the cutting line 30 is such that it partially covers the clamp 17. It ends before the cutting groove 17a. The hinged flap 18 rests on the clamp 17 in such a manner that it is raised during the lifting movement of the clamp 17 and is again lowered. However, the hinged flap 18 may be adjusted vertically independently of the lifting movement of the clamp 17, by means of the lifting device 33.

An adhesive layer 43 is arranged on the free end of the hinged flap 18 adjacent the cutting line 30. A locking rod 45 covering the entire width of the flap rests on the adhesive layer 43. This locking rod 45 is laterally mounted, in a displaceable manner, in a guide groove 44 of each of the bearing parts 18a, which may be raised by the hinged flap 18. The two guide grooves 44 are downwardly inclined in the direction of the free end of the hinged flap, or in the direction of the cutting line 30. As a result, the locking rod 45 always falls by its own weight into the region of the lowest guide groove and rests on the adhesive layer 43. The fabric web 10 is drawn between the adhesive layer 43 and the locking rod 45. As the locking rod 45 constantly presses the web 10 against the adhesive layer 43, the free end of the fabric roll 11 with the leading edge 10b, cannot slip back in the direction of the magazine 20 — after the fabric has been cut. The free end of the fabric roll 11 extends sufficiently far beyond the hinged flap 18 to enable it to be gripped by the grippers 19 on the carriage 15 (FIG. 8).

The adhesive layer may be a strip of rubber, plastic, leather, or fabric.

A plurality of adjustable grippers 19, disposed adjacent to and spaced apart from each other, are attached to the carriage 15.

Each gripper is provided with a rigid, preferably lower, abutment 46, and a movable, preferably upper, pressure part 47, which may be displaced in the direction of abutment 46 by means of a lifting device 48, e.g. a pressure cylinder, to hold fast the leading edge 10b of the web 10 to be unwound from the fabric roll 11. The lifting device 48 of each gripper 19 is controlled by the switch 23 for the purpose of gripping the web 10. It is controlled by the switch 22 on the side nearest the carriage, for the purpose of releasing the web 10. These two switches 22,23, are connected via electric lines to a control device of each of the lifting devices 48. However, for the purpose of gripping the web 10, a timing relay, or the like, is connected into the electric connection between switch 23 and lifting device 48 so that the movement of the pressure part 47 into the clamping position only takes place after the flap 18 is raised.

The process of gripping and releasing the leading edge 10b by means of the grippers 19 may also be controlled by manually activatable switches, arranged, for example, on the carriage 15.

The abutment 46 and the pressure part 47 are attached, for example, to support arms 49, which project over the carriage 15 in the direction of the fabric roll 11.

A double-armed orientable lever 51 for the control device 21 of the side edge straightener is arranged on the supporting plate 12 about a horizontal axis 50 running in the longitudinal direction of the supporting plate 12. The upper, vertical lifting arm 51a makes contact with a side edge of the web and the lower arm 51b is displaceably arranged between two switches 52, e.g. pressure switches. One of the two switches is activated depending on the curve of the side edge of the web 10 to be cut and, if necessary, the magazine 20 is pushed sideways in the opposite direction to the curve of the side edge to the extent that the web 10 is again drawn off in a straight line.

For this reason, the two switches 52 of the control device 21 are connected via electric lines to a drive means 53, for example, a drive motor. The drive means 52 is disposed below the supporting plate 12 on the underframe 13, and it drives by means of a belt drive 69, or the like, a threaded spindle 54 running parallel to the cutting line 30. A threaded part (mother) 55 of the magazine grips the threaded spindle 54 in a form locking manner. When the threaded spindle 54 is turned in one direction or the other, the threaded part 55 is displaced in a reciprocating manner and it carries with it the magazine 20.

The two switches 52 of the control device 21 are also connected via electric lines to the switch 28 disposed on the delivery device 71 or the hinged flap 18. The switch 28 is switched as a function of the web 10 and only keeps the two switches 52 ready for operation if the switching part 28a of the same is activated.

The magazine 20 has a movable frame 56 on which two bearing flanges 57 are rotatably arranged about a horizontal axis 58. The bearing flanges 57 are provided with recesses 59 for the axes 60 of the individual fabric rolls 11. A circular rod 61, preferably made of rubber, plastic, or the like, is provided in each of the circular openings forming the recesses 59 of at least one bearing flange 57. The axis 60 of a fabric roll 11 is partially introduced into the rod 61 by way of its annular tee-slot 62, thus securing the axis against axial displacement and also restricting its rotary movement.

The bearing flange 57 is rotated mechanically. The flange bearing the desired fabric roll 11 is thus rotated without manual assistance in the direction of the delivery device 71.

It is within the scope of the invention to divide up the delivery device 71 or the hinged flap 18 widthwise. In this way, it is not necessary to move the entire flap with fabric rolls of different width, but only the requisite part of the same. The different parts of the flap are advantageously designed to join together to form a rigid hinged flap 18.

The carriage 15 may also be provided with a drive mechanism, for example, a drive motor, which moves the carriage in a reciprocating manner.

The above-described device operates as follows:

The fabric roll 11, from which the fabric pieces 10 are to be cut, is brought into the region of the delivery device 71, or the hinged flap 18, by rotating the bearing flange 57 of the magazine 20. The free end of the fabric roll 11 is then placed on the hinged flap 18 and drawn under the locking rod 45 until the leading edge 10b of the same projects beyond the hinged flap 18 and can be gripped by the grippers 19. The carriage 15 is then pushed in the direction of the fabric roll 11. In the course thereof it reaches the abutting ledge 32 and activates the switch 23 which causes the hinged flap 18 to rise into the delivery position (FIG. 6) and effects the subsequent gripping of the leading edge 10b by the grippers 19. The carriage 15 is now moved in the opposite direction. With the leading edge 10b gripped by the grippers 19, the desired length of web 10 is drawn from the fabric roll 11. When the carriage 15 leaves the abutting ledge 32, the switch 23 is released. The hinged flap 18 id downwardly displaced about its axis 42 and its free end comes to rest on the clamp 17. If the switch 22 on the carriage 15 abuts against the stop 31, which has been adjusted to the desired length of fabric to be cut (FIG. 1), the grippers 19 release the leading edge 10b of the fabric web 10. In addition, the drive mechanism 35 receives an impulse and moves the cross-cutting device 16 at right angles to the direction of movement of the carriage, so that the web 10 is cut in the cutting groove 17a. When the cross-cutting device 16 has cut the web, it abuts against the switch 24, which brings about its return movement. The follow-up action of the drive mechanism 35 of the cross-cutting device 16 activates the switch 25, which gives the lifting device 38, an impulse. As a result, the clamp 17 is raised. The cut end, or the end edge 10a of the piece of fabric, which has just been cut and which rests on the supporting plate 12, can now slide down from the clamp 17. The cross-cutting device 16 is stopped at the end of its return movement by its switch 26 moving against the stop 16a while the clamp is raised.

The activation of the switch 27 by the stop 41 causes the clamp to be lowered again. At the same time, it secures against slippage, the end edge 10a of the web 10, between itself and the supporting plate 12.

The carriage 15 can now be pushed in the direction of the magazine 20 to draw a fresh piece of fabric 10 from the roll 11. As the carriage 15 moves against the abutting ledge 32, the switch 23 causes the hinged flap to rise up and grip the new leading edge 10b, and the above-described process begins again.

During these individual movements, the upper, vertical, lifting arm 51a of the control device 21 constantly sweeps a side edge of the web 10 and ensures that the same is kept straight by moving the magazine 20 in a reciprocating manner by means of the drive mechanism 53 activated by the switches 52.

What is claimed is:

1. A device for cutting pieces of fabric from fabric rolls and for laying the pieces square on top of one another characterized by:
   a. a rotatable magazine (20) holding a plurality of fabric rolls (11); said magazine being arranged at one of the front ends of a known supporting plate (12) and being displaceable parallel to the ends of the supporting plate (12) on a frame (56), which is preferably provided with tread rollers (68),
   b. a carriage (15) displaceable in a reciprocating manner in a longitudinal direction along the supporting plate (12); said carriage (15) drawing the desired length of fabric (10) to be cut from one of the fabric rolls (11) in the magazine (20),
   c. a cross-cutting device (16) for cutting the pieces of fabric (10); said device moving in a reciprocating manner at right angles to the direction of movement of the carriage (15) and as a function of the same,
   d. a control device (21) for keeping straight, in a longitudinal direction of the supporting plate (12), the side edges of the fabric pieces (10) drawn away from the fabric rolls (11) of the magazine (20) by the carriage (15); said control device (21) keeping the side edges of the fabric pieces (10) straight by displacing the magazine (20) in the opposite direction to the direction of movement of the side edges, and parallel to the front end of the supporting plate (12) and the cutting line (30) of the cross-cutting device (16).

2. A device according to claim 1, characterized by a locking device (70) controllable as a function of the cross-cutting device (16); said locking device (70) holding the roll end, or end edge (10a) of the cut fabric pieces (10) resting on the supporting plate (12), and preferably being a clamp (17).

3. A device according to claim 2, characterized in that the cross-cutting device (16) consists of a drive motor (16a) provided with a rotary disc (16b) mounted on its shaft journal; said cross-cutting device (16) being displacebbly mounted in a outting groove (17a) of the claim (17) and being driven in a reciprocating manner by means of a belt drive (34), or the like, by a drive mechanism (35) for example, an electric motor, disposed below the supporting plate (12).

4. A device according to claim 2, characterized in that a stop (26a), which activates a switch (26) arranged on the cross-cutting device (16), on the approach of said switch (26), and thereby stops the cross-cutting device (16), is arranged in the opposite end region of the clamp (17) to the switches (24, 25).

5. A device according to claim 2, characterized in that the clamp (17) is guided for vertical movement by means of guides (36, 37) for example, guide rods and guide rollers, and is displaced vertically by a lifting device (38) e.g. a pressure cylinder, controlled by a sitch (25).

6. A device according to claim 5, characterized in that a vertically adjustable stop (41) is attached to the guides (36) of the clamp (17) and that a switch (27) is arranged on the underframe (13) of the supporting plate (12); said switch (27) being activated by the stop (41) and limiting the lifting movement of the clamp (17).

7. A device according to claim 6, characterized in that together with the clamp (17) and a traverse support (39) arranged below the supporting plate (12), the guides (36) form a vertically displaceable frame and that the drive mechanism (35) for the reciprocating movement of the cross-cutting device (16) in the cutting line (30), is arranged on the traverse support (39).

8. A device according to claim 1, characterized by a delivery device (71) for the leading edge (10b) of the fabric web (10) to be drawn from one of the fabric rolls (11) in the magazine (20); said device being controlled as a function of the carriage (15).

9. A device according to claim 8, characterized in that a switch (23), which sets into motion the delivery device (71), is attached to the supporting plate (12) in the region of the guide rail (14) adjacent the cutting line (30); said switch being activated by the carriage (15) by means of a movable part of the guide rail (14) preferably an abutting ledge (32) arranged on the guide rail (14).

10. A device according to claim 8, characterized in that the delivery device (71) consists of a hinged flap (18) displaceable about an axis (42) arranged parallel to the cutting line (30); said delivery device (71) being displaced in a reciprocating manner by means of a lifting device (33) e.g. a pressure cylinder, controlled by the abutting ledge (32) or the switch (23).

11. A device according to claim 10, characterized in that the two switches (52) of the control device (21) are connected via electric lines to a switching part (28a), e.g., a function bail blade, which is arranged on the hinged flap (18), projects into the plane of motion of the web (10), and is activated by the same; said switching part (28a) keeping the two switches (52) in operational readiness as a function of the web (10).

12. A device according to claim 10, characterized in that an adhesive layer (43) e.g. a plastic, rubber, or leather strip, is attached to the part of the hinged flap (18) adjacent the cutting line (30), and that a locking rod (45) guided in lateral, guide grooves (44) downwardly inclined in the direction of the cutting line (30) rests by its own weight on the adhesive layer (43); said locking rod (45) holding the leading edge (10b) of a piece of fabric (10) to be cut and preventing it from slipping back in the direction of the fabric roll (11).

13. A device according to claim 12, characterized in that the end of the hinged flap (18) facing the cutting line (30) projects into the vertical adjustment region of the clamp (17).

14. A device according to claim 1, characterized in that the carriage (15) is provided with tread rollers (29), which are guided in guide rails (14) arranged along the support plate (12).

15. A device according to claim 1, characterized in that the carriage (15) is provided with a plurality of grippers (19) spaced adjacent to each other at intervals and designed to hold fast the leading edge (10b) of the piece of fabric (10) to be cut from one of the fabric rolls (11) in the magazine (20).

16. A device according to claim 15, characterized in that the grippers (19) of the carriage (15) each consist of a rigid abutment 46 and a vertically adjustable pressure part (47) and that the pressure part (47), which is displaceable in the direction of the abutment (46) is connected to a lifting device (48), e.g. a pressure cylinder, controlled by the switch (23) activated by the abutting ledge (32), for the purpose of wedging the leading edge (10b) of the web (10) to be removed from a fabric roll (11).

17. A device according to one or more of claim 15, characterized in that a stop (31) is arranged in the region of the guide rails (14) at a distance from the cutting line (30) of the cross-cutting device (16); said stop (31) being displaceably mounted on the supporting plate (12) and cooperating with a switch (22), which is arranged on the carriage (15) and which causes the cross-cutting device (16) to effect the cutting movement and the grippers (19) of the carriage (15) to release the fabric.

18. A device according to claim 17, characterized in that a switch (23), which sets into motion the delivery device (71), is attached to the supporting plate (12) in the region of the guide rail (14) adjacent the cutting line (30); said switch being activated by the carriage (15) by means of a movable part of the guide rail (14) preferably an abutting ledge (32) arranged on the guide rail (14).

19. A device according to claim 1, characterized in that the cross-cutting device (16) consists of a drive motor (16a) provided with a rotary disc (16b) mounted on its shaft journal; said cross-cutting device (16) being displaceably mounted in a cutting groove (17a) of the clamp (17) and being driven in a reciprocating manner by means of a belt drive (34), or the like, by a drive mechanism (35) for example, an electric motor, disposed below the supporting plate (12).

20. A device according to claim 19, characterized in that two switches (24, 25) adapted to be activated one after the other by the cross-cutting device (16) after the cutting operation is effected, are arranged in succession in the cutting direction of the cross-cutting device (16) in one of the end regions of the clamp (17) disposed at right angles to the direction of movement of the carriage (15), and close to said clamp (17) on the supporting plate (12); said switches (24, 25) effecting the return movement of the cross-cutting device (16) and a lifting movement of the clamp (17) by way of the cross-cutting device (16).

21. A device according to claim 1, characterized in that the magazine (20) is adapted to be driven by means of a drive device (53) arranged below the supporting plate (12).

22. A device according to claim 21, characterized in that the control device (21) for keeping straight the side edges comprises a double-armed control lever (51) displaceably mounted on the supporting plate (12) or the underframe (13); said control lever (51) being displaceable about an axis (50) running in the longitudinal direction of the supporting plate (12) and scanning the side edge of the web (10) with its vertical, upper arm (51a); its lower arm being displaceably mounted between two switches (52), both of which are connected via electric lines to the magazine (20) for the purpose of keeping the sides straight as a function of the movement of the reciprocating drive mechanism (53) of the control lever (51).

23. A device according to claim 1, characterized in that the control device (21) for keeping straight the side edges comprises a double-armed control lever (51) displaceably mounted on the supporting plate (12) or the underframe (13); said control lever (51) being displaceable about an axis (50) running in the longitudinal direction of the supporting plate (12) and scanning the side edge of the web (10) with its vertical, upper arm (51a); its lower arm being displaceably mounted between two switches (52), both of which are connected via electric lines to the magazine (20) for the purpose of keeping the sides straight as a function of the movement of the reciprocating drive mechanism (53) of the control lever (51).

24. A device according to claim 23, characterized in that the two switches (52) of the control device (21) are connected via electric lines to a switching part (28a), e.g., a function bail blade, which is arranged on the hinged flap (18), projects into the plane of motion of the web (10), and is activated by the same; said switching part (28a) keeping the two switches (52) in operational readiness as a function of the web (10).

25. A device according to claim 1, characterized in that a stop (26a), which activates a switch (26) arranged on the cross-cutting device (16), on the approach of said switch (26), and thereby stops the cross-cutting device (16), is arranged in the opposite end region of the clamp (17) to the switches (24, 25).

26. A device according to claim 1, characterized in that two bearing flanges (57) rotatable about a horizontal axis (58) and having a plurality of recesses (59) for the axes (60) of the fabric rolls (11), are arranged in the frame (56) of the magazine (20); the recesses (59) of at least one bearing flange (57) having an annular supporting bar (61) for each of the axes (60), preferably a bar made of plastic, rubber, or the like, and each axis (60) having at least one annular tee-slot (62).

* * * * *